(12) United States Patent
Li

(10) Patent No.: US 12,363,532 B2
(45) Date of Patent: Jul. 15, 2025

(54) METHOD FOR PROTECTING TERMINAL PARAMETER UPDATE AND COMMUNICATION APPARATUS

(71) Applicant: Huawei Technologies Co., Ltd., Shenzhen (CN)

(72) Inventor: Fei Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 134 days.

(21) Appl. No.: 17/936,634

(22) Filed: Sep. 29, 2022

(65) Prior Publication Data

US 2023/0035970 A1 Feb. 2, 2023

Related U.S. Application Data

(63) Continuation of application No. PCT/CN2021/077280, filed on Feb. 22, 2021.

(30) Foreign Application Priority Data

Mar. 31, 2020 (CN) .......................... 202010247619.8
Apr. 14, 2020 (CN) .......................... 202010292085.0

(51) Int. Cl.
*H04W 12/069* (2021.01)
*H04W 12/041* (2021.01)
*H04W 12/0431* (2021.01)

(52) U.S. Cl.
CPC ....... *H04W 12/069* (2021.01); *H04W 12/041* (2021.01); *H04W 12/0431* (2021.01)

(58) Field of Classification Search
CPC ............. H04W 12/069; H04W 12/041; H04W 12/0431
See application file for complete search history.

(56) References Cited

U.S. PATENT DOCUMENTS

2016/0183091 A1\* 6/2016 Norrman ................. H04L 63/08
455/411
2019/0342851 A1 11/2019 Shan et al.
(Continued)

FOREIGN PATENT DOCUMENTS

CN 108848495 A 11/2018
CN 109041054 A 12/2018
(Continued)

OTHER PUBLICATIONS

Sander de Kievit, Kundan Tiwari: "Method for Synchronization of Home Network Key", NEC Corporation, a corporation organized and existing under the laws of Japan, of 7-1, Shiba 5-chome, Minatoku, Tokyo 108-8001, Japan, Mar. 1, 2019 , 63 pages. (Year: 2019).\*

(Continued)

*Primary Examiner* — Chau Le
(74) *Attorney, Agent, or Firm* — Slater Matsil, LLP

(57) ABSTRACT

A UDM sends a protection request message to a first AUSF; and the UDM receives a response message that is of the protection request message and that is sent by the first AUSF, and sends terminal parameters update information via an AMF corresponding to a first serving network, where the protection request message requests to protect the terminal parameters update information, and the protection request message carries the terminal parameters update information and information about the first serving network.

18 Claims, 6 Drawing Sheets

(56) References Cited

U.S. PATENT DOCUMENTS

2021/0392495 A1* 12/2021 Tsiatsis .................. H04W 12/40
2022/0141661 A1* 5/2022 Kievit .................. H04W 12/069
                                                                                             455/411

FOREIGN PATENT DOCUMENTS

| CN | 109041057 A | | 12/2018 | |
|---|---|---|---|---|
| JP | WO2020179665 | * | 9/2020 | ............... H04L 9/08 |
| WO | WO2018208949 | * | 11/2018 | ............ H04W 12/06 |
| WO | 2019017689 A1 | | 1/2019 | |

OTHER PUBLICATIONS

NEC, "KAUSF desynchronization problem and solutions", 3GPP TSG-SA WG3#95, S3-191203, Reno, NV, US, May 6-10, 2019, 8 pages.

China Mobile, "Revisit the KAUSF desynchronization problem", 3GPP TSG SA WG3 (Security) Meeting #95Bis, S3-192135, Sapporo, Japan, Jun. 24-28, 2019, 5 pages.

ZTE Corporation, "Handling of Sync failure for 5G AKA", 3GPP TSG SA WG3 #95, S3-191200, Reno, NV, US, May 6-10, 2019, 6 pages.

China Mobile, "Correction of Reference", 3GPP TSG SA WG3 #95Bis, S3-192142, Sapporo, Japan, Jun. 24-28, 2019, 13 pages.

Arkko, J. et al., "Improved Extensible Authentication Protocol Method for 3rd Generation Authentication and Key Agreement (EAP-AKA)", Request for Comments: 5448, Network Working Group, May 2009, 29 pages.

NEC, "Synchronization of KAUSF between AUSF and UE", 3GPP TSG-SA WG3 Meeting #95, S3-191206, Reno, US, May 6-10, 2019, 12 pages.

Qualcomm Inc., "pCR: Multiple Registrations in different PLMNs using Kes AUSF (Updated)", 3GPP TSG SA WG3 (Security) Meeting #90, S3-180259, Gothenburg, Sweden, Jan. 22-26, 2018, 4 pages.

3GPP TS 33.501 V16.2.0 (Mar. 2020), 3rd Generation Partnership Project; Technical Specification Group Services and System Aspects; Security architecture and procedures for 5G system (Release 16), 227 pages.

ZTE Corp., "Handling of Sync failure", 3GPP TSG-SA WG3 Meeting #96, S3-193189, Wroclaw, Poland, Aug. 26-30, 2019, 4 pages.

* cited by examiner

METHOD FOR PROTECTING TERMINAL PARAMETER UPDATE AND COMMUNICATION APPARATUS

CROSS-REFERENCE TO RELATED APPLICATIONS

This application is a continuation of International Application No. PCT/CN2021/077280, filed on Feb. 22, 2021, which claims priority to Chinese Patent Application No. 202010292085.0, filed on Apr. 14, 2020 and Chinese Application No. 202010247619.8, filed on Mar. 31, 2020. All of the aforementioned patent applications are hereby incorporated by reference in their entireties.

TECHNICAL FIELD

This application relates to the field of terminal parameters security technologies, and in particular, to a method for protecting terminal parameters update and a communication apparatus.

BACKGROUND

In a new radio (NR) network system, there are multiple network entities capable of performing different network functions. For example, the NR system includes a visited public land mobile network (VPLMN) and a home public land mobile network (HPLMN). In a communication process, an HPLMN entity sends some configuration parameters to a terminal. In the sending process, the HPLMN entity needs to send the configuration parameters to the terminal via a VPLMN entity. For example, a unified data management (UDM) entity in the HPLMN needs to send updated subscription data to the terminal via an access and mobility management function (AMF) entity in the VPLMN. For another example, a policy control function (PCF) entity in the HPLMN needs to send policy information to the terminal sequentially via a PCF entity and an AMF entity in the VPLMN.

It can be learned that a parameter to be sent by an HPLMN entity to the terminal can be forwarded only via a VPLMN entity. However, the parameter may be intercepted or tampered with by the VPLMN entity in the forwarding process, causing security risks. In view of this, the UDM requests an authentication service function (AUSF) entity in the HPLMN to protect a configuration parameter or an updated subscription parameter, or the like transmitted between the HPLMN and the terminal. To be specific, the UDM requests the AUSF entity to encrypt the parameter, and then sends the encrypted parameter to the terminal via the AMF entity.

The AUSF may protect the foregoing parameter using a key generated in an authentication process of the terminal, and the terminal verifies, using the key generated in the authentication process, the foregoing parameter sent by the AUSF. However, in a dual-registration scenario, that is, in a scenario in which the terminal registers with two serving networks, multiple keys exist in one AUSF. If the AUSF randomly selects a key to encrypt the parameter, the key selected by the AUSF is inconsistent with the key generated in the authentication process of the terminal. As a result, the terminal's verification of the parameter fails.

SUMMARY

This application provides a method for protecting terminal parameters update and a communication apparatus, to ensure security of a parameter sent by an HPLMN to a terminal in a transmission process.

According to a first aspect, an embodiment of this application provides a method for protecting terminal parameters update. The method may be performed by a first communication apparatus. The first communication apparatus may be a communication device or a communication apparatus supporting a communication device in implementing functions required by the method, for example, a chip system. The following provides descriptions by using an example in which the communication device is a UDM entity. The method includes:

The UDM sends a protection request message to a first AUSF. Then, the UDM receives a response message that is of the protection request message and that is sent by the first AUSF, and sends terminal parameters update information via an AMF corresponding to a first serving network. The protection request message requests to protect the terminal parameters update information, and the protection request message carries the terminal parameters update information and information about the first serving network.

In this embodiment of this application, the protection request message that is for protecting the terminal parameters update information and that is sent by the UDM to the first AUSF carries information (namely, the information about the first serving network) for identifying the first serving network. Therefore, the first AUSF may select, based on the information about the first serving network, a first key (which may also be considered as an authentication service function key, and is briefly referred to as a key below) corresponding to the first serving network, to encryption protect the terminal parameters update information. In this way, even if a terminal registers with a home network (HN) via multiple serving networks, that is, when an AUSF corresponds to multiple keys, a key used by the first AUSF can be specified using this solution. This ensures that the terminal successfully verifies the terminal parameters update information that is sent by the HPLMN via the AMF.

In a possible implementation, before the UDM sends the protection request message to the first AUSF, the UDM determines the information about the first serving network according to a local policy. In this solution, the UDM may specify, for the first AUSF, the first serving network for a subsequent terminal parameters update procedure, that is, the UDM specifies a key to be used by the first AUSF, to ensure that, when the terminal is in a dual-registration mode (when the terminal registers with at least two serving networks), a key selected by the first AUSF is consistent with a key generated in an authentication process of the terminal even if AMFs in the at least two serving networks select a same AUSF.

In another possible implementation, when determining that there are multiple serving networks, the UDM determines the first serving network for the terminal parameters update procedure. In this solution, the UDM determines the first serving network only when determining that there are multiple serving networks, to avoid determining, in a case in which the terminal registers with one serving network, the first serving network for a SoR procedure, that is, avoid performing an unnecessary step.

In a possible implementation, the method further includes: The UDM determines the first AUSF based on the information about the first serving network. In this solution, when the terminal registers with the HN sequentially via multiple different serving networks, and the different serving networks select different AUSFs, the UDM specifies the first AUSF to protect SoR information. Because one AUSF corresponds to one key, this can ensure that a key selected by the first AUSF is consistent with the key generated in the authentication process of the terminal.

In a possible implementation, before sending the protection request message to the first AUSF, the UDM may further determine that the first AUSF includes authentication results for the terminal in multiple serving networks, where the multiple serving networks include the first serving network; or the UDM may determine that the terminal is in multiple serving networks, where the multiple serving networks include the first serving network; or the UDM may determine that the terminal is in a dual-registration mode, that is, the terminal registers with the HN via two serving networks. The solution may include: When determining that multiple keys exist (for example, one AUSF corresponds to multiple keys or there are multiple AUSFs (each AUSF corresponds to a key)), the UDM specifies a key based on the information about the first serving network, so that the key selected by the first AUSF is consistent with the key generated in the authentication process of the terminal. This can prevent the sent protection request message from carrying unnecessary information about the first serving network.

In a possible implementation, for example, the information about the first serving network includes a name of the first serving network. For another example, the information about the first serving network includes a public land mobile network (PLMN) identifier ID of the first serving network or an ID of the first serving network. For another example, the information about the first serving network includes an authentication event identifier of the terminal. The foregoing lists only four implementations of the information about the first serving network. It should be understood that a specific implementation of the information about the first serving network is not limited in this embodiment of this application, provided that the information can identify the first serving network.

In a possible implementation, the terminal parameters update information includes steering of roaming (SoR) information.

According to a second aspect, an embodiment of this application provides a method for protecting terminal parameters update. The method may be performed by a second communication apparatus. The second communication apparatus may be a communication device or a communication apparatus supporting a communication device in implementing functions required by the method, for example, a chip system. The following provides descriptions by using an example in which the communication device is an AUSF entity. The method includes:

A first AUSF receives a protection request message sent by a UDM, where the protection request message requests to protect terminal parameters update information, the protection request message carries the parameters update information and information about a first serving network, and the protection request message requests to protect the terminal parameters update information. Then, the first AUSF determines a first key based on the information about the first serving network, where the first key is for protecting the terminal parameters update information, and security protects the terminal parameters update information based on the first key.

In a possible implementation, the information about the first serving network is information about one of multiple first serving networks that is stored by the UDM.

In a possible implementation, there are multiple AUSFs, and the first AUSF is an AUSF corresponding to the information about the first serving network.

In a possible implementation, the first AUSF includes authentication results for a terminal in multiple serving networks, where the multiple serving networks include the first serving network; the terminal is in multiple serving networks, where the multiple serving networks include the first serving network; or the terminal is in a dual-registration mode.

In a possible implementation, the information about the first serving network includes a name of the first serving network; or the information about the first serving network includes a PLMN ID of the first serving network, or the information about the first serving network includes an authentication event identifier of the terminal.

In a possible implementation, the terminal parameters update information includes steering of roaming (SoR) information.

For technical effects achieved by the second aspect or the possible implementations of the second aspect, refer to the descriptions of the technical effects of the first aspect or the possible implementations of the first aspect.

According to a third aspect, an embodiment of this application provides a method for protecting terminal parameters update. The method may be performed by a third communication apparatus. The third communication apparatus may be a communication device or a communication apparatus supporting a communication device in implementing functions required by the method, for example, a chip system. The following provides descriptions by using an example in which the communication device is a UDM entity. The method includes the following.

The UDM sends a first message to a first AUSF, where the first message indicates the first AUSF to delete a first key used when a terminal registers with a first serving network in which a first AMF is located, and the first AUSF is an AUSF for authentication when the terminal registers with the first serving network. Then, when determining that the terminal is in a single-registration mode, the UDM determines to send terminal parameters update information via a second AMF.

In this embodiment of this application, the UDM may indicate the AUSF to delete the first key used when the terminal registers with the first serving network in which the first AMF is located. In this way, even if the terminal registers with a second serving network in which the second AMF is located, it can be still ensured that a key in the AUSF is unique, that is, the key is consistent with a key in an authentication process of the terminal.

In a possible implementation, when the UDM sends a second message to the first AMF or receives a third message sent by the first AMF, the UDM sends the first message to the first AUSF, where the second message is for deleting registration information of the terminal, and the third message is a response message of the second message. In this solution, when the terminal registers with the second serving network in which the second AMF is located, the UDM may send the first message to the first AUSF. This ensures that the terminal is in the single-registration mode, and ensures that the key in the first AUSF is unique.

In a possible implementation, the first message carries identification information of the first serving network or identification information of the terminal.

According to a fourth aspect, an embodiment of this application provides a method for protecting terminal parameters update. The method may be performed by a fourth communication apparatus. The fourth communication apparatus may be a communication device or a communication apparatus supporting a communication device in implementing functions required by the method, for example, a chip system. The following provides descriptions by using an example in which the communication device is an AUSF entity. The method includes:

A first AUSF receives a first message sent by a UDM, where the first message indicates the first AUSF to delete a first key used by a terminal when the terminal registers with a first serving network in which a first AMF is located, and the first AUSF is an AUSF for authentication when the terminal registers with the first serving network. Then, the first AUSF deletes the first key used when the terminal registers with the first serving network in which the first AMF is located.

In a possible implementation, the first message carries identification information of the first serving network or identification information of the terminal.

For technical effects achieved by the fourth aspect or the possible implementations of the fourth aspect, refer to the descriptions of the technical effects of the third aspect or the possible implementations of the third aspect.

According to a fifth aspect, a communication apparatus is provided. For example, the communication apparatus is the foregoing UDM. The communication apparatus has functions of implementing behavior in the method embodiment in the first aspect. The functions may be implemented by hardware or may be implemented by hardware executing corresponding software. The hardware or software includes one or more modules corresponding to the functions. In a possible design, the communication apparatus includes, for example, a processing module and a transceiver module coupled to each other. The transceiver module is configured to: send a protection request message to a first AUSF, and receive a response message that is of the protection request message and that is sent by the first AUSF, where the protection request message requests to protect terminal parameters update information, and the protection request message carries the parameters update information and information about a first serving network. The processing module is configured to control the transceiver module to send the parameters update information via an AMF corresponding to the first serving network.

In a possible implementation, the transceiver module is further configured to: before sending the protection request message to the first AUSF, determine the information about the first serving network according to a local policy.

In a possible implementation, the processing module is specifically configured to: when determining that there are multiple serving networks, determine the first serving network for terminal parameters update.

In a possible implementation, the processing module is specifically configured to determine the first AUSF based on the information about the first serving network.

In a possible implementation, the processing module is specifically configured to: before the protection request message is sent to the first AUSF, determine that the first AUSF includes authentication results for the terminal in multiple serving networks, where the multiple serving networks include the first serving network; the terminal is in multiple serving networks, where the multiple serving networks include the first serving network; or the terminal is in a dual-registration mode.

In a possible implementation, the information about the first serving network includes a name of the first serving network; the information about the first serving network includes a PLMN identifier ID of the first serving network or an ID of the first serving network; or the information about the first serving network includes an authentication event identifier of the terminal.

In a possible implementation, the parameters update information includes SoR information.

According to a sixth aspect, a communication apparatus is provided. For example, the communication apparatus is the AUSF described above. The communication apparatus has functions of implementing behavior in the method embodiment in the second aspect. The functions may be implemented by hardware or may be implemented by hardware executing corresponding software. The hardware or software includes one or more modules corresponding to the functions. In a possible design, the communication apparatus includes, for example, a processing module and a transceiver module coupled to each other. The transceiver module is configured to receive a protection request message sent by a UDM, where the protection request message requests to protect terminal parameters update information, and the protection request message carries the parameters update information and information about a first serving network. The processing module is configured to: determine a first key based on the information about the first serving network, and security protect the parameters update information based on the first key, where the first key is for protecting the parameters update information.

In a possible implementation, the information about the first serving network is information about one of multiple first serving networks that is stored by the UDM.

In a possible implementation, there are multiple AUSFs, and the first AUSF is an AUSF corresponding to the information about the first serving network.

In a possible implementation, the first AUSF includes authentication results for a terminal in multiple serving networks, where the multiple serving networks include the first serving network; the terminal is in multiple serving networks, where the multiple serving networks include the first serving network; or the terminal is in a dual-registration mode.

In a possible implementation, the information about the first serving network includes a name of the first serving network; the information about the first serving network includes a PLMN identifier of the first serving network; or the information about the first serving network includes an authentication event identifier of the terminal.

In a possible implementation, the parameters update information includes steering of roaming SoR information.

According to a seventh aspect, a communication apparatus is provided. For example, the communication apparatus is the foregoing UDM. The communication apparatus has functions of implementing behavior in the method embodiment in the third aspect. The functions may be implemented by hardware or may be implemented by hardware executing corresponding software. The hardware or software includes one or more modules corresponding to the function. In a possible design, the communication apparatus includes, for example, a processing module and a transceiver module coupled to each other. The transceiver module is configured to send a first message to a first AUSF, where the first message indicates the first AUSF to delete a first key used when a terminal registers with a first serving network in which a first AMF is located, and the first AUSF is an AUSF for authentication when the terminal registers with a first serving network. The processing module is configured to: when determining that the terminal is in a single-registration mode, determine to send terminal parameters update information via a second AMF.

In a possible implementation, the transceiver module is specifically configured to: when sending a second message to the first AMF or receiving a third message sent by the first AMF, send the first message to the first AUSF, where the second message is for deleting registration information of the terminal, and the third message is a response message of the second message.

In a possible implementation, the first message carries identification information of the first serving network or identification information of the terminal.

According to an eighth aspect, a communication apparatus is provided. For example, the communication apparatus is the AUSF described above. The communication apparatus has functions of implementing behavior in the method embodiment in the fourth aspect. The functions may be implemented by hardware or may be implemented by hardware executing corresponding software. The hardware or software includes one or more modules corresponding to the functions. In a possible design, the communication apparatus includes, for example, a processing module and a transceiver module coupled to each other. The transceiver module is configured to receive a first message sent by a UDM, where the first message indicates a first AUSF to delete a first key used when a terminal registers with a first serving network in which a first AMF is located, and the first AUSF is an AUSF for authentication when the terminal registers with the first serving network. The processing module is configured to delete the first key used when the terminal registers with the first serving network in which the first AMF is located.

In a possible implementation, the first message carries identification information of the first serving network or identification information of the terminal.

According to a ninth aspect, a communication apparatus is provided. The communication apparatus may be the UDM in the foregoing method embodiments or a chip deployed in the UDM. Alternatively, the communication apparatus may be the AUSF in the foregoing method embodiments or a chip deployed in the AUSF. The communication apparatus includes a communication interface and a processor. Optionally, the communication apparatus further includes a memory. The memory is configured to store a computer program or instructions. The processor is coupled to the memory and the communication interface. When the processor executes the computer program or the instructions, the communication apparatus is enabled to perform the method performed by the corresponding functional entity in the foregoing method embodiments. For example, when the processor executes the computer program or the instructions, the communication apparatus is enabled to perform the method performed by the UDM in the foregoing method embodiments. For another example, when the processor executes the computer program or the instructions, the communication apparatus is enabled to perform the method performed by the AUSF in the foregoing method embodiments.

The communication interface in the communication apparatus in the ninth aspect may be a transceiver in the communication apparatus. For example, the communication interface is implemented using an antenna, a feeder, a codec, and the like in the communication apparatus. Alternatively, if the communication apparatus is a chip deployed in the communication apparatus, the communication interface may be an input/output interface of the chip, for example, an input/output pin.

According to a tenth aspect, a communication system is provided. The communication system includes any communication apparatus in the fifth aspect and any communication apparatus in the sixth aspect, or includes any communication apparatus in the seventh aspect and any communication apparatus in the eighth aspect.

According to an eleventh aspect, this application provides a chip system. The chip system includes a processor for implementing functions of the UDM or the AUSF in the methods in the foregoing aspects. In a possible design, the chip system further includes a memory for storing program instructions and/or data. The chip system may include a chip, or may include a chip and another discrete component.

According to a twelfth aspect, a computer program product is provided. The computer program product includes computer program code. When the computer program code is run, the methods performed by the UDM or the AUSF in the foregoing aspects are performed.

According to an thirteenth aspect, this application provides a computer-readable storage medium. The computer-readable storage medium stores a computer program. When the computer program is run, the methods performed by the UDM or the AUSF in the foregoing aspects are performed.

In embodiments of this application, the protection request message that is for protecting the terminal parameters update information and that is sent by the UDM to the first AUSF carries an identifier indicating the first serving network. Even if a terminal registers with the HN via multiple serving networks, that is, when one AUSF corresponds to multiple keys, a key used by the first AUSF can be specified. This ensures that the terminal successfully verifies the parameters update information in a terminal parameters update procedure performed by the UDM.

DETAILED DESCRIPTION OF ILLUSTRATIVE EMBODIMENTS

The following describes the technical solutions in embodiments of the present invention with reference to the accompanying drawings in embodiments of the present invention. In the descriptions of this application, unless otherwise specified, "multiple" means two or more than two. In addition, it should be understood that, in the descriptions of embodiments of this application, terms such as "first" and "second" are merely intended for differentiated description, and should not be construed as an indication or an implication of relative importance, or an indication or an implication of a sequence.

Figure 1:
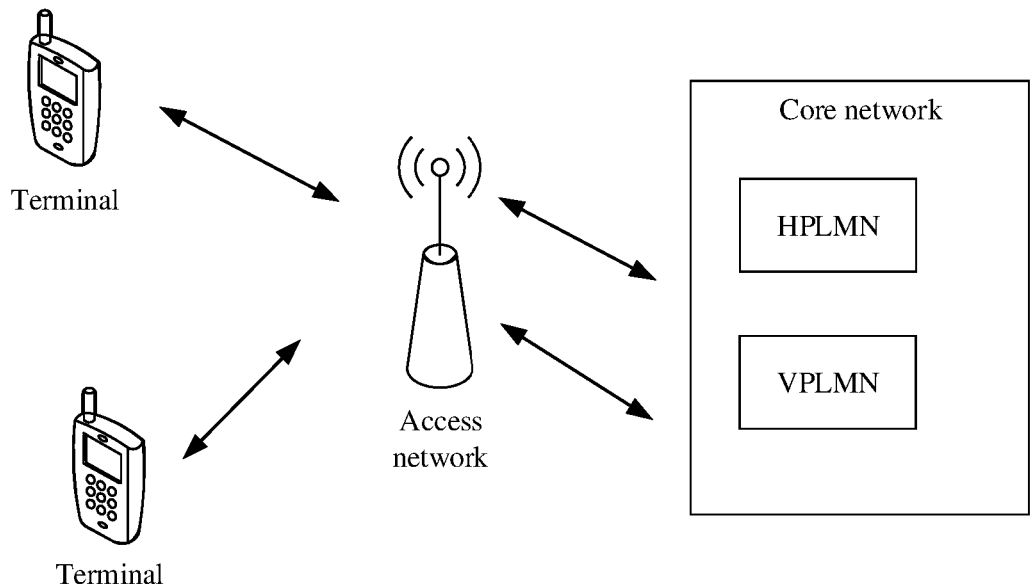
FIG. 1 is a schematic diagram of a network architecture according to an embodiment of this application.

FIG. 1 is a schematic diagram of a network architecture applicable to an embodiment of this application. The network architecture may be applied to an NR communication system or a next-generation communication system. The network architecture includes a core network, an access network, and a terminal.

The access network is mainly to control the terminal to wirelessly access a mobile communication network. The access network is a part of a mobile communication system, and implements a radio access technology. Conceptually, the access network resides in a device (such as a mobile phone, a computer, or any remote controller), and provides a connection to the core network.

The core network includes a VPLMN and an HPLMN. The VPLMN includes a mobility management network element (an AMF entity is used as an example in this specification), a session management network element (an SMF entity is used as an example in this specification), a policy control network element (a PCF entity is used as an example in this specification), and the like. The HPLMN includes an authentication service function network element (an AUSF entity is used as an example in this specification), a data management network element (a UDM entity is used as an example in this specification), an AMF entity, a PCF entity, and the like.

The AMF may be responsible for authentication for a terminal, mobility management of the terminal, selection of an SMF entity, maintenance and management of status information of the terminal, and the like. In 5G communication, the mobility management network element may be an AMF network element. In future communication, for example, in 6th generation (6G) communication, the mobility management network element may still be the AMF network element or may have another name. This is not limited in this application.

The SMF includes session-related functionalities such as session management (for example, session establishment, modification, and release, including tunnel maintaining between a UPF and a RAN), selection and control of a UPF network element, determining a service and session continuity (SSC) mode, and roaming. In 5G communication, the session management network element may be an SMF network element. In future communication, for example, in 6G communication, the session management network element may still be the SMF network element or may have another name. This is not limited in this application.

The UPF includes user plane-related functionalities such as packet routing and transmission, packet inspection, traffic usage reporting, quality of service (QoS) handling, lawful interception, uplink traffic verification, and downlink packet buffering. In 5G communication, the user plane network element may be a UPF network element. In future communication, for example, in 6G communication, the user plane network element may still be the UPF network element or have another name. This is not limited in this application.

The UDM is an operator-specific control plane network element, and is responsible for storing information such as a subscription permanent identifier (SUPI), a credential, a security context, and subscription data of a subscriber in an operator's network. The information stored in the UDM network element may be for authentication and authorization for the terminal device to access the operator's network.

The subscriber in the operator's network may be specifically a user using a service provided by the operator's network, for example, a user using a China Telecom SIM card, or a user using a China Mobile SIM card. The subscription permanent identifier (SUPI) of the subscriber may be a number of the SIM card or the like. The credential and the security context of the subscriber may be stored small files such as an encryption key of the SIM card or encryption-related information of the SIM card, which are for authentication and/or authorization. The security context may be data (cookie), a token, or the like stored in a local terminal (for example, a mobile phone) of a subscriber. The subscription data of the subscriber may be a supporting service of the SIM card, for example, a data package or an available network of the SIM card. It should be noted that the permanent identifier, the credential, the security context, the authentication data (cookie), and the token are equivalent to authentication and authorization-related information. For ease of description, they are not limited or distinguished between each other in this application document of the present invention. Unless otherwise specified, security context is used as an example for description in embodiments of this application. However, authentication and/or authorization information described in another manner are also applicable to embodiments of this application. In 5G communication, the data management network element may be a UDM network element. In future communication, for example, in 6G communication, the data management network element may still be the UDM network element or may have another name. This is not limited in this application.

The PCF is an operator-specific control plane function providing policies of a PDU session for the SMF network element. The policies may include a charging-related policy, a QoS-related policy, an authorization-related policy, and the like. In 5G communication, the policy control network element may be a PCF network element. In future communication, for example, in 6G communication, the policy control network element may still be the PCF network element or may have another name. This is not limited in this application.

The AUSF has an authentication service function for terminating an authentication function requested by a network element that attempts to authenticate the terminal. In an authentication process, the AUSF receives an authentication vector sent by the UDM, processes the authentication vector, and sends a processed authentication vector to the network element that attempts to authenticate the terminal.

The terminal, also be referred to as user equipment (UE), is a device having a wireless transceiver function. The terminal may be deployed on land, including an indoor device, an outdoor device, a handheld device, or a vehicle-mounted device; or may be deployed on the water (for example, on a ship); or may be deployed in the air (for example, on aircraft, balloons, satellites). The terminal device may be a mobile phone, a tablet computer (pad), a computer having a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like.

The HPLMN entities may communicate with each other through interfaces, or may communicate with the VPLMN entities through interfaces. For example, in a roaming scenario, the HPLMN needs to send parameters to the terminal, for example, parameters of a home network such as a preferred PLMN or subscription data that needs to be updated. An HPLMN entity, for example, the UDM, needs to send these parameters to the terminal via a VPLMN entity, for example, the AMF. For another example, the PCF entity in the HPLMN needs to send policy information to the terminal sequentially via the PCF entity and the AMF entity in the VPLMN. Considering security levels of these parameters and the like, the HPLMN needs to prevent the VPLMN and the like from tampering with these parameters. Therefore, in the process in which the HPLMN sends these parameters to the terminal, these parameters are encryption protected using a key generated by the AUSF in the HPLMN. Because the terminal generates a key in a process of registering with a network, the terminal can verify received parameters using the corresponding key, provided that the key of the terminal is consistent with a key used by the AUSF for protecting the parameters transmitted between the HPLMN and the terminal.

However, in a dual registration scenario for the terminal, the key selected by the AUSF may be inconsistent with the key on the terminal side. As a result, verification at the terminal fails.

Figure 2:
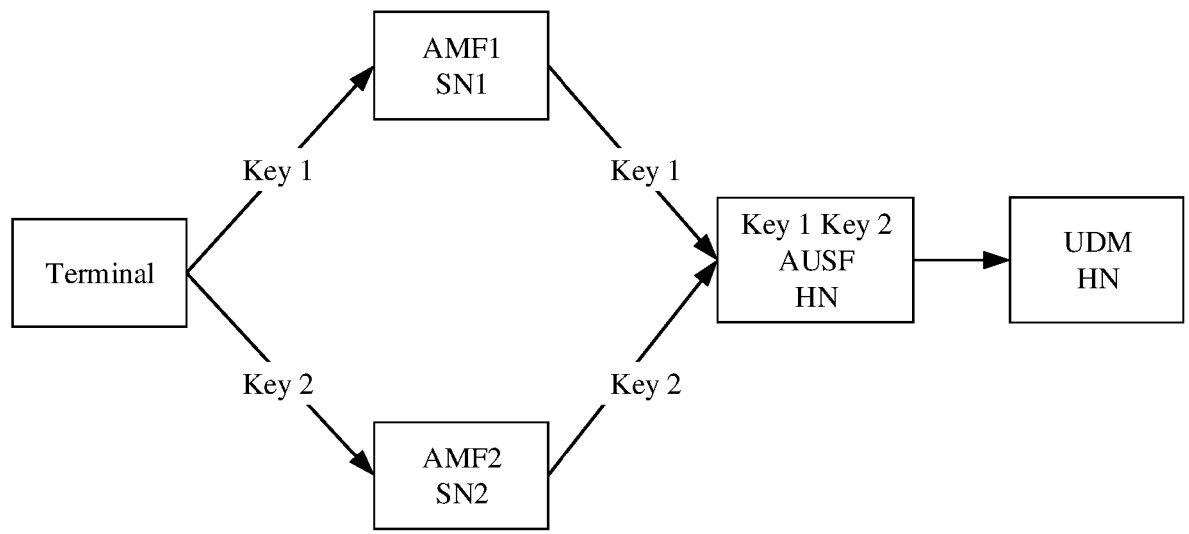
FIG. 2 is a schematic diagram of a roaming architecture in a network architecture according to an embodiment of this application.

For example, FIG. 2 is a roaming architectural diagram of a network architecture to which an embodiment of this application is applicable. In FIG. 2, a terminal registers via two serving networks (SNs). To be specific, the terminal registers with an AMF 1 using a key 1, and the terminal registers with an AMF 2 using a key 2. The AMF 1 and the AMF 2 select a same AUSF in an HN of the terminal. It should be understood that the AUSF corresponds to two keys (the key 1 and the key 2). Alternatively, the terminal first registers with the HN via an SN1, and then registers with the HN via an SN2, and the SM and the SN2 select a same AUSF in the HN of the terminal. In this case, if a UDM needs to perform a SoR procedure or a UE parameters update (UPU) procedure, the UDM sends a protection request message to the AUSF. If the AUSF randomly selects one of the keys to encryption protect SoR information or UPU information, the key selected by the AUSF may be inconsistent with a key on the terminal side. As a result, the terminal's verification on the received SoR information or UPU information fails. For example, the UDM selects the AMF 2 for the subsequent SoR procedure, but the key selected by the AUSF is the key 1, which is obviously inconsistent with the key 2 on the terminal side. As a result, verification on the received SoR information fails on the terminal side.

Figure 3:
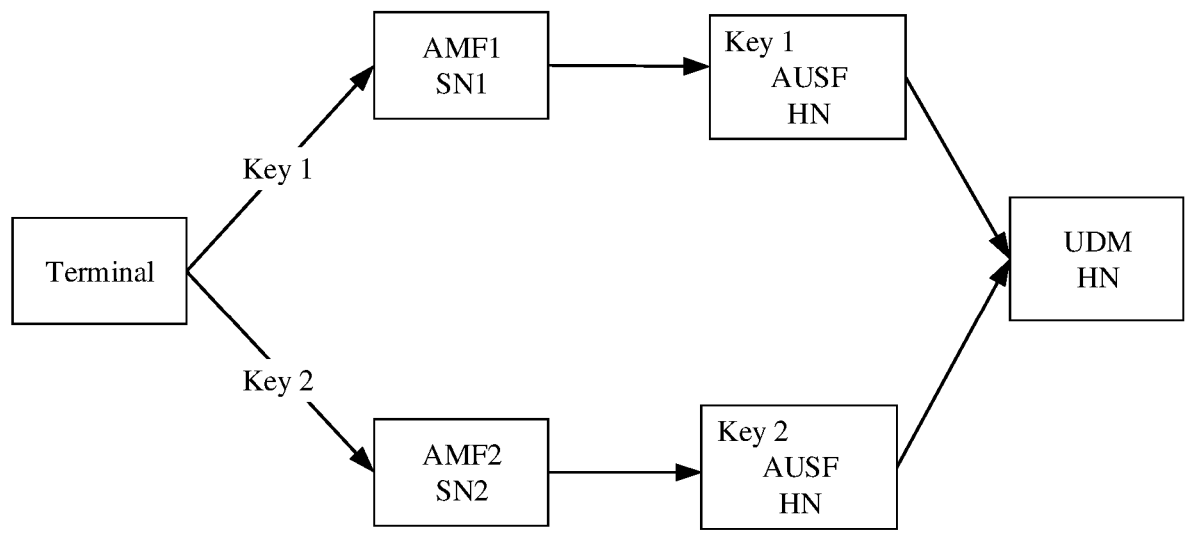
FIG. 3 is a schematic diagram of another roaming architecture in a network architecture according to an embodiment of this application.

For another example, FIG. 3 is a roaming architectural diagram of a network architecture to which an embodiment of this application is applicable. In FIG. 3, a terminal registers via two ANs. To be specific, the terminal registers with an AMF 1 using a key 1, and the terminal registers with an AMF 2 using a key 2. The AMF 1 selects an AUSF 1 in an HN of the terminal, and the AMF 2 selects an AUSF 2 in the HN of the terminal. It should be understood that a key 1 exists in the AUSF 1, and a key 2 exists in the AUSF 2. Similar to FIG. 2, there are two keys on the AUSF side. In this case, if a UDM randomly selects an AUSF to encryption protect SoR information or UPU information, a key in the selected AUSF may be inconsistent with a key on the terminal side. As a result, the received SoR information or UPU information fails the verification of the terminal. For example, the AMF 1 performs the subsequent SoR procedure for the terminal side, but the UDM selects the AUSF 2 to protect the SoR information, that is, a key selected by the AUSF 2 is the key 2. Obviously, the key 2 is inconsistent with the key 1 on the terminal side. As a result, verification on the received SoR information fails on the terminal side.

In view of this, embodiments of this application provide a protection method for network roaming and a communication apparatus. In embodiments of this application, a UDM sends an identifier of an SN included in a protection request message to an AUSF. In other words, the UDM indicates the selected SN, so that an AUSF selects a key corresponding to the SN. Because a key of a terminal uniquely corresponds to the SN, and a key selected by the AUSF uniquely corresponds to the SN, it can be ensured that the key on the AUSF side is consistent with the key on the terminal side, and that the terminal successfully verifies SoR information in a SoR procedure performed by the UDM or UPU information in a UPU procedure performed by the UDM.

The following describes in detail the method provided in embodiments of this application with reference to the accompanying drawings.

Figure 4:
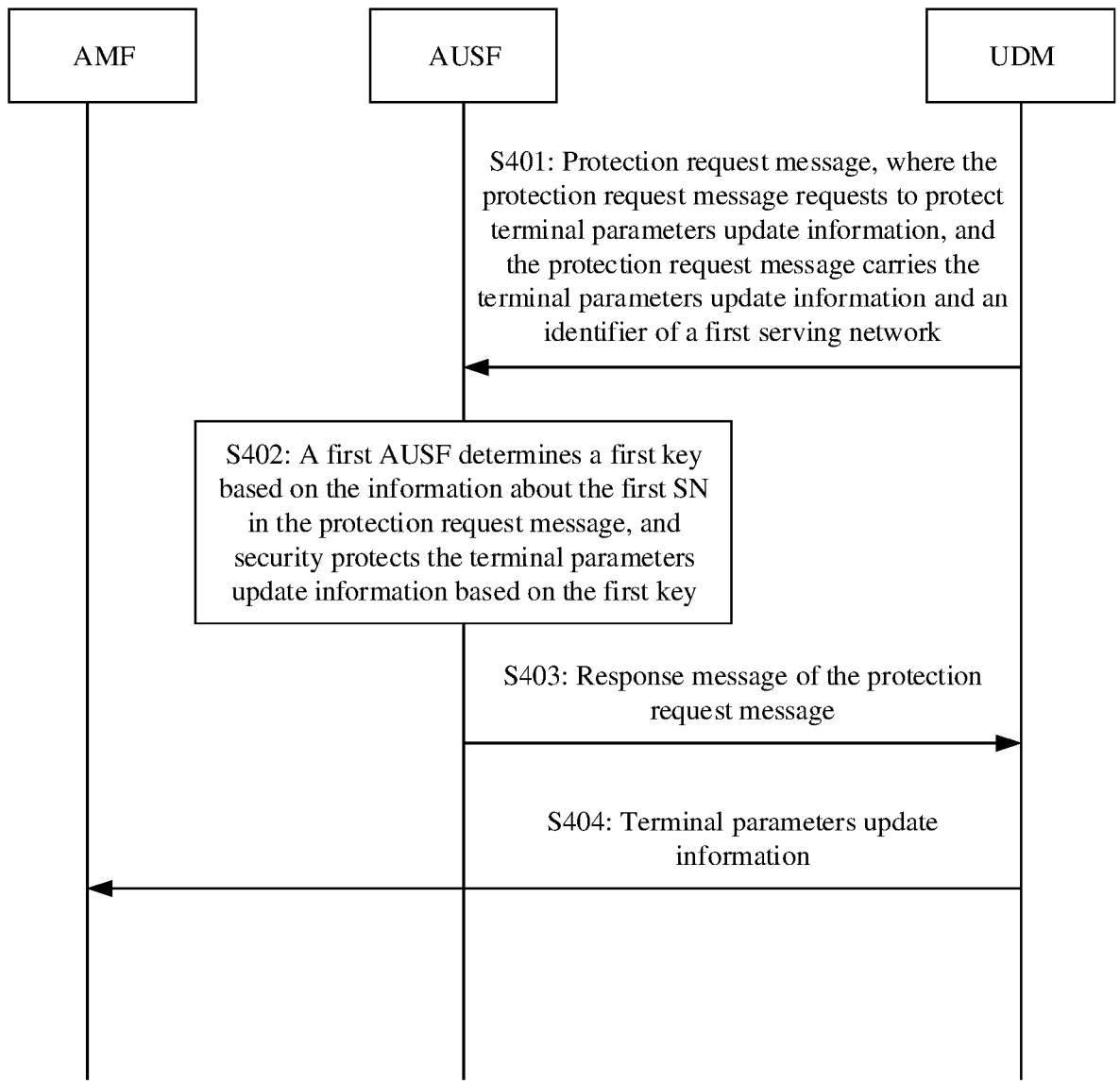
FIG. 4 is a schematic flowchart of a method for protecting terminal parameters update according to an embodiment of this application.

FIG. 4 is a flowchart of a positioning method according to an embodiment of this application. The following provides description using an example in which the method is applied to the communication systems shown in FIG. 1 to FIG. 3. In addition, the method may be performed by two communication apparatuses. The two communication apparatuses are, for example, a first communication apparatus and a second communication apparatus. For ease of description, the following uses an example in which the method is performed by an AUSF and a UDM. In other words, an example in which the first communication apparatus is the UDM and the second communication apparatus is the AUSF is used. It should be noted that in embodiments of this application, the communication systems in FIG. 1 to FIG. 3 are only used as an example, which are not limited to this scenario. In addition, embodiments of this application are applicable to protection of parameters update information sent by an HPLMN to a terminal via an AMF. For example, embodiments of this application are applicable to a SoR procedure or a UPU procedure. The following uses an example in which the terminal parameters update information is SoR information.

Specifically, a specific procedure of the method for protecting terminal parameters update provided in an embodiment of this application is described as follows.

S401: A UDM sends a protection request message to a first AUSF, and the first AUSF receives the protection request message, where the protection request message requests to protect terminal parameters update information, and the protection request message carries the parameters update information and information about a first SN.

This embodiment of this application resolves the following problem: When the terminal registers with an HN via multiple SNs, a key used by an AUSF for protecting a parameter sent between the HPLMN and the terminal is inconsistent with a key on the terminal side. Therefore, in this embodiment of this application, the protection request message sent to the first AUSF by the UDM carries identification information of an SN. It should be understood that the identification information indicates an SN serving the terminal, where the SN is referred to as the first SN in this specification. In other words, the UDM may select the first SN from multiple SNs in advance, and then select an AUSF corresponding to the first SN to encryption protect the terminal parameters update information. Because the key of the terminal uniquely corresponds to the first SN, and the key selected by the AUSF also uniquely corresponds to the first SN, it can be ensured that the key on the AUSF side is consistent with the key on the terminal side, and that the terminal successfully verifies SoR information in a SoR procedure performed by the UDM or UPU information in a UPU procedure performed by the UDM.

It should be understood that, if the terminal parameters update information is SoR information, the protection request message requests to protect the SoR information. Therefore, in some embodiments, the protection request message is also referred to as a SoR protection request (SoR protection request) message. It should be noted that a name of the protection request message is not specifically limited in this embodiment of this application. For example, if the protection request message is for protecting terminal subscription data update, the protection request message may also be referred to as a UPU protection request message.

There are multiple specific implementations of identifying the first SN, and this is not limited in this embodiment of this application. For example, SN information for identifying the first SN may be a name of the first SN, a PLMN ID of the first SN, or an ID of the first SN. Alternatively, the information about the first SN may include an authentication event identifier of the terminal. It should be understood that the authentication event ID (authEvent ID) of the terminal is sent by the UDM to the AUSF in an authentication procedure to identify an authentication event of the UE in the first SN. Therefore, the authEvent ID may uniquely correspond to a key.

S402: The first AUSF determines a first key based on the information about the first SN in the protection request message, and security protect the terminal parameters update information based on the first key.

It should be understood that the first key may be considered as an authentication service function key (Kausf). If the information about the first serving network is the name of the first SN, the ID of the first SN, or the PLMN ID of the first SN, the first AUSF may select a corresponding Kausf based on a SUPI and the information about the first serving network, and encryption protect, using the Kausf, the SoR information carried in the protection request message. If the information about the first serving network is the authEvent ID, the first AUSF may select a corresponding Kausf based on the authEvent ID, and encryption protect, using the Kausf, the SoR information carried in the protection request message. The first AUSF may generate a protection result for protecting a parameter of the terminal, for example, a MAC value or other information.

S403: The first AUSF sends a response message of the protection request message to the UDM.

It should be understood that the first AUSF sends the response message to the UDM after generating the protection result, where the response message is a message in response to the protection request message.

In some embodiments, the response message may include information such as a SoR counter or a UPU counter, a SoR message authentication code MAC, or a UPU message authentication code MAC, to notify the first AUSF of the protection result of the terminal parameters update information.

S404: The UDM sends the terminal parameters update information via an AMF corresponding to the first serving network.

After receiving the response message sent by the first AUSF, the UDM may perform the terminal parameters update procedure, for example, the SoR procedure via the first SN. For example, the UDM initiates a request message for invoking a subscription data management notification (SDM_notification) service to the AMF in the first SN, where the request message carries roaming configuration information, for example, a priority list of a combination of a PLMN and access technologies, or a SoR message authentication code MAC.

In some embodiments, before sending the protection request message to the first AUSF, the UDM determines the first SN for the terminal parameters update procedure. The terminal may be in a single-registration mode or a dual-registration mode. When the terminal is in the single-registration mode, the UDM may not determine the first SN, that is, may not perform the step for determining the first SN.

Figure 5:
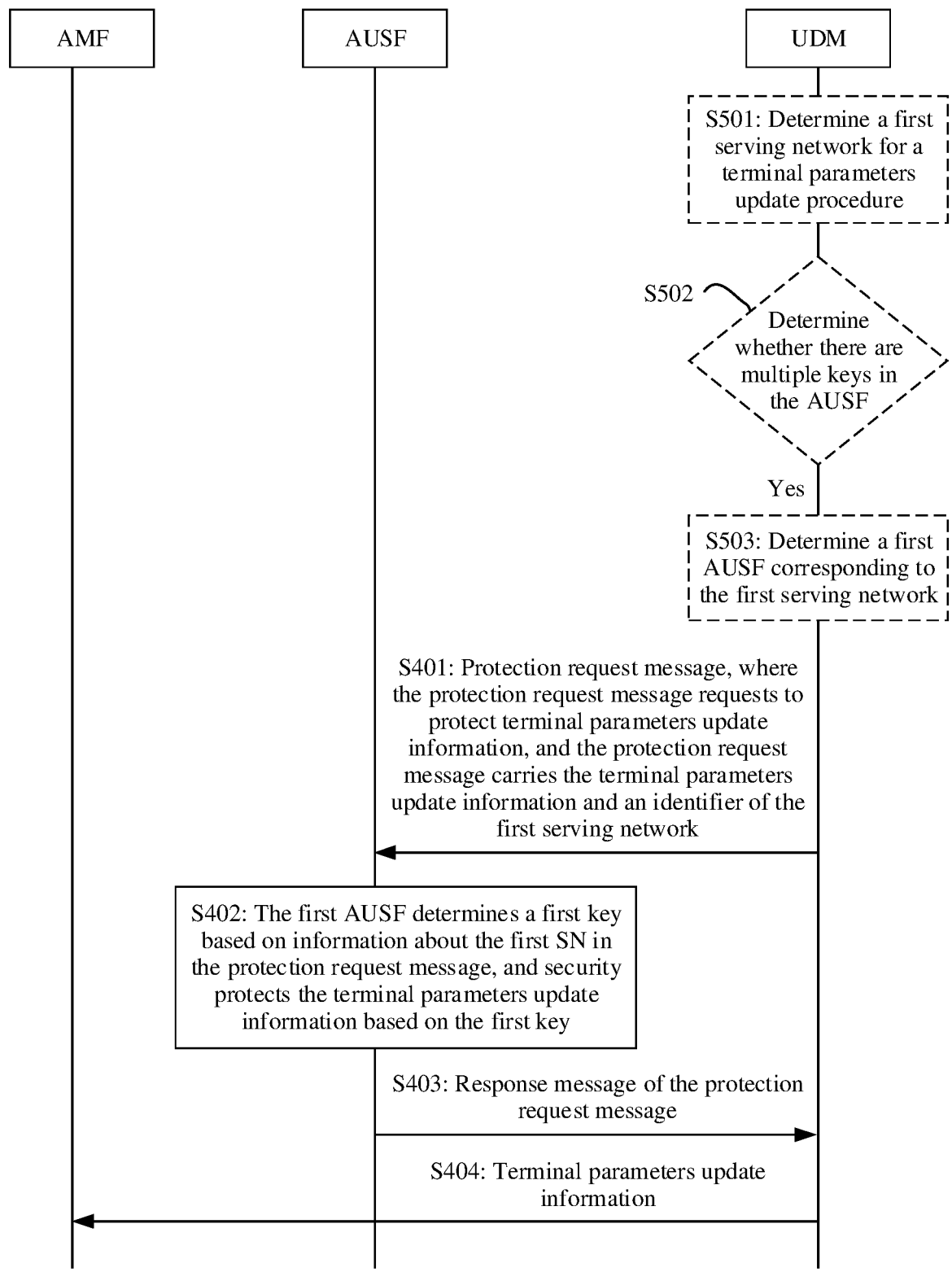
FIG. 5 another schematic flowchart of a method for protecting terminal parameters update according to an embodiment of this application.

For example, FIG. 5 is an example flowchart of a method for protecting terminal parameters update according to an embodiment of this application.

S501: Before sending a protection request message to a first AUSF, a UDM determines a first SN for a terminal parameters update procedure.

In this embodiment of this application, before sending the protection request message, the UDM may determine the first SN in which an AMF sending terminal parameters update information is located. Because the first SN is selected before the protection request message is sent, even if the terminal is in a dual-registration mode (that is, the terminal registers with at least two serving networks) and AMFs in the at least two serving networks select a same AUSF, it can be ensured that a key selected by the first AUSF is consistent with a key generated in an authentication process of the terminal.

In some embodiments, the UDM may determine, according to a local policy, the first SN in which the AMF sending the terminal parameters update information is located. For example, the UDM determines, based on information such as a priority, the first SN in which the AMF sending the terminal parameters update information is located.

Further, when determining that there are multiple SNs, the UDM determines the first SN for the subsequent terminal parameters update procedure. This can avoid a case in which the UDM still determines the first SN for the subsequent terminal parameters update procedure in case of one SN. This has better compatibility with an existing mechanism of the terminal parameters update procedure.

S502: Before sending the protection request message to the first AUSF, the UDM determines whether there are multiple keys in the AUSF.

For example, before sending the protection request message to the first AUSF, the UDM may determine whether the first AUSF includes authentication results for the terminal in multiple SNs. If the first AUSF includes authentication results for the terminal in the multiple SNs, it may be considered that multiple keys exist in the first AUSF. In this case, the protection request message sent by the UDM to the first AUSF may carry an identifier of an SN. It should be understood that the multiple SNs include the first SN. Otherwise, if there are no authentication results for the terminal in the multiple SNs in the first AUSF, it may be considered that no multiple keys exist in the first AUSF, that is, one key exists in the first AUSF. In this case, the protection request message sent by the UDM to the first AUSF may not carry an identifier of an SN.

For another example, before sending the protection request message to the first AUSF, the UDM may determine whether the terminal is in multiple SNs. If the terminal is in multiple SNs, it may be considered that multiple keys exist in the first AUSF. In this case, the protection request message sent by the UDM to the first AUSF may carry an identifier of an SN. It should be understood that the multiple SNs include the first SN. Otherwise, if the terminal is not in multiple SNs, it may be considered that no multiple keys exist in the first AUSF, that is, tone key exists in the first AUSF. In this case, the protection request message sent by the UDM to the first AUSF may not carry an identifier of an SN.

It should be noted that, that the terminal is in multiple SNs means that the terminal device accesses multiple SNs; or multiple SNs provide services for the terminal; or the terminal registers with multiple SNs; or the terminal is authenticated in multiple SNs; or registration modes of the terminal with multiple SNs exist in the UDM; or authentication states of the terminal in multiple SNs exist in the UDM.

For still another example, before sending the protection request message to the first AUSF, the UDM may determine whether the terminal is in a dual-registration mode, that is, determine whether the terminal registers with the HN via two SNs. If the terminal is in a dual-registration mode, it may be considered that multiple keys exist in the first AUSF. In this case, the protection request message sent by the UDM to the first AUSF may carry an identifier of an SN. Otherwise, if the terminal is not in a dual-registration mode, it may be considered that no multiple keys exist in the first AUSF, that is, one key exists in the first AUSF. In this case, the protection request message sent by the UDM to the first AUSF may not carry an identifier of an SN.

Before sending the protection request message to the first AUSF, the UDM determines whether there are multiple keys in the AUSF. The UDM sends an identifier of an SN only when determining that there are multiple keys in the AUSF. This can prevent the sent protection request message from carrying an unnecessary identifier. In addition, the UDM specifies a key based on the identifier of the first SN, so that the key selected by the first AUSF is consistent with the key generated in the authentication process of the terminal.

S503: Before sending the protection request message to the first AUSF, the UDM determines the first AUSF corresponding to the first SN.

In this embodiment of this application, the first AUSF may be an AUSF, for example, the AUSF shown in FIG. 2, selected by multiple SNs in the dual-registration scenario of the terminal. Alternatively, the first AUSF may be an AUSF in multiple AUSFs in the dual-registration scenario of the terminal, for example, an AUSF in the two AUSFs shown in FIG. 3. It should be understood that, in the scenario shown in FIG. 3, the first AUSF is selected by the UDM from multiple AUSFs. Therefore, before sending the protection request message to the first AUSF, the UDM may select the first AUSF from the multiple AUSFs. In this way, even if the terminal registers with the HN sequentially via multiple different serving networks, and the different serving networks select different AUSFs, because the UDM specifies the first AUSF to protect SoR information, and the first AUSF corresponds to a unique SN (or corresponds to a unique key), it can be ensured that the key selected by the first AUSF is consistent with the key generated in the authentication process of the terminal.

It should be noted that, as S501, S502, and S503 are optional steps, they are shown using dashed lines in FIG. 5. In addition, a sequence of S501, S502, and S503 is not limited in this embodiment of this application.

Figure 6:
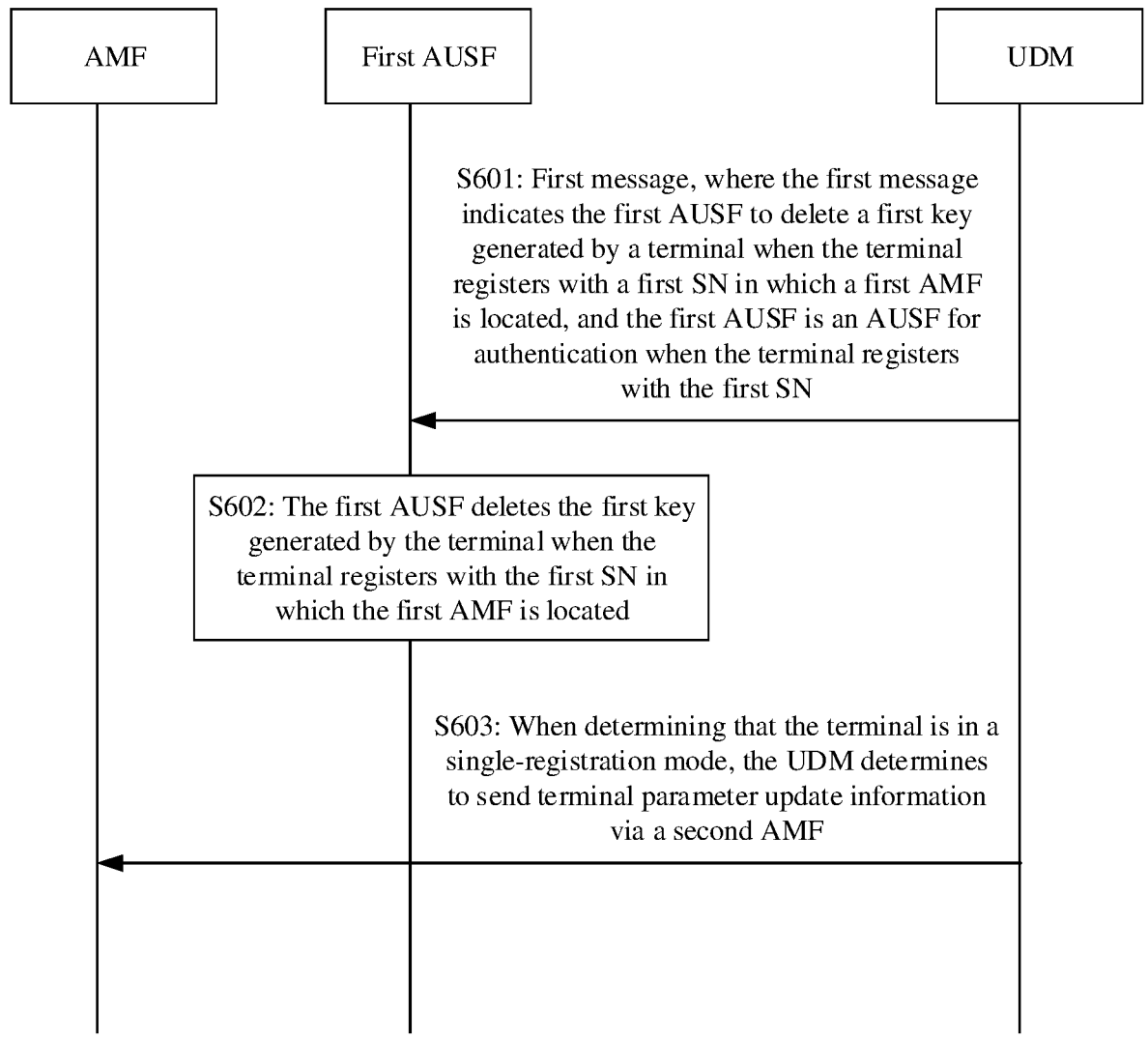
FIG. 6 is a schematic diagram of schematic flowchart of another method for protecting terminal parameters update according to an embodiment of this application.

In an alternative solution of the foregoing embodiment, FIG. 6 is a schematic flowchart of another method for protecting terminal parameters update according to an embodiment of this application. The process is described as follows:

S601: A UDM sends a first message to a first AUSF, and the first AUSF receives the first message, where the first message indicates the first AUSF to delete a first key generated when a terminal registers with a first SN in which a first AMF is located, and the first AUSF is an AUSF for authentication when the terminal registers with the first SN.

S602: The first AUSF deletes the first key generated by the terminal when the terminal registers with the first SN in which the first AMF is located.

S603: When determining that the terminal is in a single-registration mode, the UDM determines to send terminal parameters update information via a second AMF.

In a possible scenario, for example, if the terminal first registers with an HN via an SN1, and then registers with the HN via an SN2, there are two first keys in the AUSF. In this case, in this embodiment of this application, when the terminal registers with an SN in which another AMF (the second AMF is used as an example below) is located, the UDM may indicate a corresponding AUSF to delete the first key used when the terminal registers with the first SN in which the registered AMF (the first AMF is used as an example below) is located. In this way, even if the terminal registers with the SN2 in which the second AMF is located, it can be ensured that a key in the AUSF is unique, that is, the key is consistent with a key in an authentication process of the terminal.

It should be understood that the first message carries identification information of the first serving network or identification information of the terminal, so that the AUSF determines to delete the key corresponding to the first serving network.

It should be understood that, when sending a second message to the first AMF, for example, a message (Nudm_UECM_DeregistrationNotify message) for deleting registration information of the terminal, the UDM sends the first message to the first AUSF. Alternatively, when receiving a response message, namely, a third message (Nudm_SDM_Unsubscribe message), that is of the second message and that is sent by the first AMF, the UDM sends the first message to the first AUSF.

In this embodiment of this application, a protection request message that is for protecting terminal parameters update information and that is sent by the UDM to the first AUSF carries an identifier indicating the first serving network. Even if the terminal registers with the HN via multiple serving networks, that is, when one AUSF corresponds to multiple keys, a key used by the first AUSF can be specified. This ensures that the terminal successfully verifies the parameters update information in a terminal parameters update procedure performed by the UDM.

As an alternative solution of the foregoing embodiment, to ensure that the terminal and the AUSF obtain a same $K_{AUSF}$ when using authentication service function keys $K_{AUSF}$, the UE, the AUSF, and the UDM may perform the following action:

The UE deletes a stored old $K_{AUSF}$ or deleting a stored old $K_{AUSF}$ generated in a same serving network upon the terminal receives a security mode command SMC message, or upon the terminal receives a security mode command SMC message and successfully performs verification, or upon the terminal receives an AUTN and successfully performs verification, or upon the terminal sends an authentication response, or upon the terminal sends a security mode complete (security mode complete message), or upon the terminal receives an extensible authentication protocol success EAP success message, or upon the terminal generates a new $K_{AUSF}$. In an optional implementation, when the terminal generates a new $K_{AUSF}$ and/or the foregoing condition is met, a timer may further be set. When the timer expires, the terminal deletes the stored old $K_{AUSF}$ or deletes the old $K_{AUSF}$ generated in the same serving network.

The AUSF deletes the stored old $K_{AUSF}$ generated during authentication for the terminal or deletes the stored old $K_{AUSF}$ generated by the terminal during authentication in the same serving network, upon successfully verifying an authentication response returned by the terminal, or upon sending an authentication result confirmation request for the terminal to the UDM, or upon generating a new $K_{AUSF}$, or upon receiving an authentication result confirmation response for the terminal returned by the UDM. In an optional implementation, when the AUSF generates a new $K_{AUSF}$ during authentication for the terminal and/or when the foregoing condition is met, a timer may further be set. When the timer expires, the AUSF deletes the stored old $K_{AUSF}$ generated during authentication for the terminal or deletes the old $K_{AUSF}$ generated by the terminal during authentication in the same serving network.

When the UDM needs to perform SoR or UPU, the UDM selects an AUSF that successfully completes an authentication procedure with the terminal most recently. It should be understood that after completing authentication with the terminal, the AUSF returns an authentication result for the terminal to the UDM, where the authentication result records an authentication time and a name of a serving network. Therefore, the UDM may select, based on the recorded time, an AUSF that completes authentication most recently. In an optional implementation, because the authentication result further records the name of the serving network, the UDM may further select an AUSF, in the serving network in which SoR or UPU is performed, that successfully completes an authentication procedure with the terminal most recently. In an optional implementation, because different AUSFs may share a same $K_{AUSF}$ of the terminal, the UDM may randomly select an AUSF.

In this way, even if the terminal sequentially registers with the HN via multiple different serving networks and different serving networks select a same AUSF or different AUSFs, because the UE and the AUSF side maintain a same $K_{AUSF}$, there is a unique key $K_{AUSF}$ in the AUSF or there is a unique $K_{AUSF}$ for a same serving network when the UDM specifies an AUSF to protect SoR or UPU information, and it can be ensured that a key selected by the AUSF is consistent with a key selected by the terminal.

Specifically, for example, in a primary authentication procedure between the terminal and a network, for EAP-AKA' authentication, the UDM returns a UE authentication obtaining response to the AUSF, where the response carries keys CK' and IK'. After receiving the UE authentication obtaining response returned by the UDM, the AUSF returns a UE authentication response to a security anchor function SEAF (which may be co-deployed with the AMF). After receiving the UE authentication response returned by the AUSF, the SEAF initiates an authentication request to the UE. The UE receives the authentication request sent by the SEAF, calculates an authentication response and keys CK' and IK', and returns the authentication response to the SEAF, where the authentication response is comprised in an EAP response. After receiving the authentication response of the UE, the SEAF initiates a UE authentication request to the AUSF, where the UE authentication request carries the EAP response. The AUSF authenticates the received EAP response. If the authentication succeeds, the AUSF generates a first $K_{AUSF}$ based on CK' and IK' obtained from the UDM, and also deletes a stored old $K_{AUSF}$ (if any). Then, the AUSF returns a UE authentication response to the SEAF, where the UE authentication response carries an EAP success message. After receiving the UE authentication response from the AUSF, the SEAF returns the EAP success message to the UE. Upon receiving the EAP success message, the UE generates a second $K_{AUSF}$ based on the calculated CK' and IK', and deletes a stored old $K_{AUSF}$ (if any). The first $K_{AUSF}$ is the same as the second $K_{AUSF}$. In this way, the old keys $K_{AUSF}$ stored on the UE side and the AUSF side are deleted in the primary authentication procedure. This ensures that the unique first $K_{AUSF}$ exists on the AUSF side and the unique second $K_{AUSF}$ exists on the UE side. When the UDM needs to perform SoR or UPU, the UDM selects an AUSF that completes primary authentication with the UE most recently, and the selected AUSF stores only a $K_{AUSF}$ consistent with that of the UE, to ensure that the key selected by the AUSF is consistent with the key selected by the terminal.

Specifically, for example, in a primary authentication procedure between the terminal and a network, for 5G AKA authentication, the UDM returns a UE authentication obtaining response to the AUSF, where the response carries a first $K_{AUSF}$. After receiving the UE authentication obtaining response returned by the UDM, the AUSF returns a UE authentication response to a security anchor function SEAF (which may be co-deployed with the AMF), where the UE authentication response carries an authentication token AUTN. After receiving the UE authentication response returned by the AUSF, the SEAF initiates an authentication request to the UE, where the authentication request carries the AUTN. Upon receiving the authentication request sent by the SEAF, and successfully checking the AUTN, the UE calculates an authentication response RES* and a second key $K_{AUSF}$, deletes a stored old $K_{AUSF}$ (if any), and then returns an authentication response to the SEAF, where the authentication response carries the RES*. After receiving the authentication response of the UE, the SEAF initiates a UE authentication request to the AUSF, where the UE authentication request carries the RES*. After the AUSF authenticates the received RES*, the AUSF deletes a stored old $K_{AUSF}$ (if any) if the authentication succeeds, or deletes the first $K_{AUSF}$ if the authentication fails. The first $K_{AUSF}$ is the same as the second $K_{AUSF}$. In this way, the old keys $K_{AUSF}$ stored on the UE side and the AUSF side are deleted in the primary authentication procedure. This ensures that the unique first $K_{AUSF}$ exists on the AUSF side and the unique second $K_{AUSF}$ exists on the UE side. When the UDM needs to perform SoR or UPU, the UDM selects an AUSF that completes primary authentication with the UE most recently, and the selected AUSF stores only a $K_{AUSF}$ consistent with that of the UE, to ensure that the key selected by the AUSF is consistent with the key selected by the terminal.

Specifically, for another example, in a primary authentication procedure and a security mode command SMC procedure between the terminal and the network, for EAP-AKA' authentication, the UDM returns a UE authentication obtaining response to the AUSF, where the UE authentication obtaining response carries keys CK' and IK'. After receiving the UE authentication obtaining response returned by the UDM, the AUSF returns a UE authentication response to a security anchor function SEAF (which may be co-deployed with the AMF). After receiving the UE authentication response returned by the AUSF, the SEAF initiates an authentication request to the UE. The UE receives the authentication request sent by the SEAF, calculates an authentication response and keys CK' and IK', and returns the authentication response to the SEAF, where the authentication response is comprised in an EAP response. After receiving the authentication response of the UE, the SEAF initiates a UE authentication request to the AUSF, where the UE authentication request carries the EAP response. The AUSF authenticates the received EAP response. If the authentication succeeds, the AUSF generates a first $K_{AUSF}$ based on CK' and IK' obtained from the UDM, and deletes a stored old $K_{AUSF}$ (if any). Then, the AUSF returns a UE authentication response to the SEAF, where the UE authentication response carries an EAP success message. After receiving the UE authentication response from the AUSF, the SEAF returns the EAP success message to the UE. Upon receiving the EAP success message, the UE generates a second $K_{AUSF}$ based on the calculated CK' and IK'. The first $K_{AUSF}$ is the same as the second $K_{AUSF}$. After the authentication, the AMF sends a security mode command SMC message to the terminal, and the terminal deletes a stored old $K_{AUSF}$ (if any) upon the security mode command SMC message is successfully integrity checked. In this way, the old keys $K_{AUSF}$ stored on the UE side and the AUSF side are deleted in the primary authentication procedure and the security mode command SMC procedure. This ensures that the unique first $K_{AUSF}$ exists on the AUSF side and the unique second $K_{AUSF}$ exists on the UE side. When the UDM needs to perform SoR or UPU, the UDM selects an AUSF that completes primary authentication with the UE most recently, and the selected AUSF stores only a $K_{AUSF}$ consistent with that of the UE, to ensure that the key selected by the AUSF is consistent with the key selected by the terminal.

Specifically, for another example, in a primary authentication procedure and a security mode command SMC procedure between the terminal and the network, for 5G AKA authentication, the UDM returns a UE authentication obtaining response to the AUSF, where the UE authentication obtaining response carries a first $K_{AUSF}$. After receiving the UE authentication obtaining response returned by the UDM, the AUSF returns a UE authentication response to a security anchor function SEAF (which may be co-deployed with the AMF), where the UE authentication response carries an authentication token AUTN. After receiving the UE authentication response returned by the AUSF, the SEAF initiates an authentication request to the UE, where the authentication request carries the AUTN. The UE receives the authentication request sent by the SEAF, and after successfully verifying the AUTN, the UE calculates an authentication response RES* and a second key $K_{AUSF}$, and then returns an authentication response to the SEAF, where the authentication response carries the RES*. After receiving the authentication response of the UE, the SEAF initiates a UE authentication request to the AUSF, where the UE authentication request carries the RES*. After the AUSF authenticates the received RES*, the AUSF deletes a stored old $K_{AUSF}$ (if any) if the authentication succeeds, or deletes the first $K_{AUSF}$ if the authentication fails. The first $K_{AUSF}$ is the same as the second $K_{AUSF}$. After the authentication, the AMF sends a security mode command SMC message to the terminal, and the terminal deletes a stored old $K_{AUSF}$ (if any) upon the security mode command SMC message is successfully integrity checked. In this way, the old keys $K_{AUSF}$ stored on the UE side and the AUSF side are deleted in the primary authentication procedure and the security mode command SMC procedure. This ensures that the unique first $K_{AUSF}$ exists on the AUSF side and the unique second $K_{AUSF}$ exists on the UE side. When the UDM needs to perform SoR or UPU, the UDM selects an AUSF that completes primary authentication with the UE most recently, and the selected AUSF stores only a $K_{AUSF}$ consistent with that of the UE, to ensure that the key selected by the AUSF is consistent with the key selected by the terminal. Specifically, for example, in a primary authentication procedure, a security mode command SMC procedure, and an authentication result confirmation procedure between the terminal and the network, for EAP-AKA' authentication, the UDM returns a UE authentication obtaining response to the AUSF, where the response carries keys CK' and IK'. After receiving the UE authentication obtaining response returned by the UDM, the AUSF returns a UE authentication response to a security anchor function SEAF (which may be co-deployed with the AMF). After receiving the UE authentication response returned by the AUSF, the SEAF initiates an authentication request to the UE. The UE receives the authentication request sent by the SEAF, calculates an authentication response and keys CK' and IK', and returns the authentication response to the SEAF, where the authentication response is comprised in an EAP response. After receiving the authentication response of the UE, the SEAF initiates a UE authentication request to the AUSF, where the UE authentication request carries the EAP response. The AUSF authenticates the received EAP response. If the authentication succeeds, the AUSF generates a first $K_{AUSF}$ based on CK' and IK' obtained from the UDM. Then, the AUSF returns a UE authentication response to the SEAF, where the UE authentication response carries an EAP success message. After receiving the UE authentication response from the AUSF, the SEAF returns the EAP success message to the UE. Upon receiving the EAP success message, the UE generates a second $K_{AUSF}$ based on the calculated CK' and IK'. The first $K_{AUSF}$ is the same as the second $K_{AUSF}$. After the authentication, the AMF sends a security mode command SMC message to the terminal, and the terminal deletes a stored old $K_{AUSF}$ (if any) upon the security mode command SMC message is successfully integrity checked. In addition, after the AUSF completes authentication on the UE, the AUSF sends an authentication result confirmation request for the terminal to the UDM, and deletes a stored old $K_{AUSF}$ (if any) upon receiving an authentication result confirmation response for the terminal returned by the UDM. In this way, the old keys $K_{AUSF}$ stored on the UE side and the AUSF side are deleted in the primary authentication procedure, the security mode command SMC procedure, and the authentication result confirmation procedure. This ensures that the unique first $K_{AUSF}$ exists on the AUSF side and the unique second $K_{AUSF}$ exists on the UE side. When the UDM needs to perform SoR or UPU, the UDM selects an AUSF that completes primary authentication with the UE most recently, and the selected AUSF stores only a $K_{AUSF}$ consistent with that of the UE, to ensure that the key selected by the AUSF is consistent with the key selected by the terminal.

Specifically, for another example, in a primary authentication procedure, a security mode command SMC procedure, and an authentication result confirmation procedure between the terminal and a network for 5G AKA authentication, the UDM returns a UE authentication obtaining response to the AUSF, where the UE authentication obtaining response carries the first $K_{AUSF}$. After receiving the UE authentication obtaining response returned by the UDM, the AUSF returns a UE authentication response to a security anchor function SEAF (which may be co-deployed with the AMF), where the UE authentication response carries an authentication token AUTN. After receiving the UE authentication response returned by the AUSF, the SEAF initiates an authentication request to the UE, where the authentication request carries the AUTN. After receiving the authentication request sent by the SEAF, and successfully verifying the AUTN, the UE calculates an authentication response RES* and a second key $K_{AUSF}$, and then returns an authentication response to the SEAF, where the authentication response carries the RES*. After receiving the authentication response of the UE, the SEAF initiates a UE authentication request to the AUSF, where the UE authentication request carries the RES*. The first $K_{AUSF}$ is the same as the second $K_{AUSF}$. After the authentication, the AMF sends a security mode command SMC message to the terminal, and the terminal deletes a stored old $K_{AUSF}$ (if any) upon the security mode command SMC message is successfully integrity checked. In addition, after the AUSF authenticates the UE, the AUSF sends an authentication result confirmation request for the terminal to the UDM, and deletes a stored old $K_{AUSF}$ (if any) upon receiving an authentication result confirmation response for the terminal returned by the UDM. In this way, the old keys $K_{AUSF}$ stored on the UE side and the AUSF side are deleted in the primary authentication procedure, the security mode command SMC procedure, and the authentication result confirmation procedure. This ensures that the unique first $K_{AUSF}$ exists on the AUSF side and the unique second $K_{AUSF}$ exists on the UE side. When the UDM needs to perform SoR or UPU, the UDM selects an AUSF that completes primary authentication with the UE most recently, and the selected AUSF stores only a $K_{AUSF}$ consistent with that of the UE, to ensure that the key selected by the AUSF is consistent with the key selected by the terminal.

In the foregoing embodiments provided in this application, the methods provided in embodiments of this application are described from the perspective of interaction between the UDM and the AUSF. To implement the functions in the methods provided in embodiments of this application, the UDM and the AUSF each may include a hardware structure and/or a software module, to implement the foregoing functions in a form of the hardware structure, the software module, or a combination of the hardware structure and the software module. Whether a specific function in the foregoing functions is performed by the hardware structure, the software module, or the combination of the hardware structure and the software module depends on a specific application and a design constraint of the technical solutions.

The following describes, with reference to the accompanying drawings, apparatuses for implementing the foregoing methods in embodiments of this application. Therefore, all the foregoing content may be used in the following embodiments. Repeated content is not described again.

Figure 7:
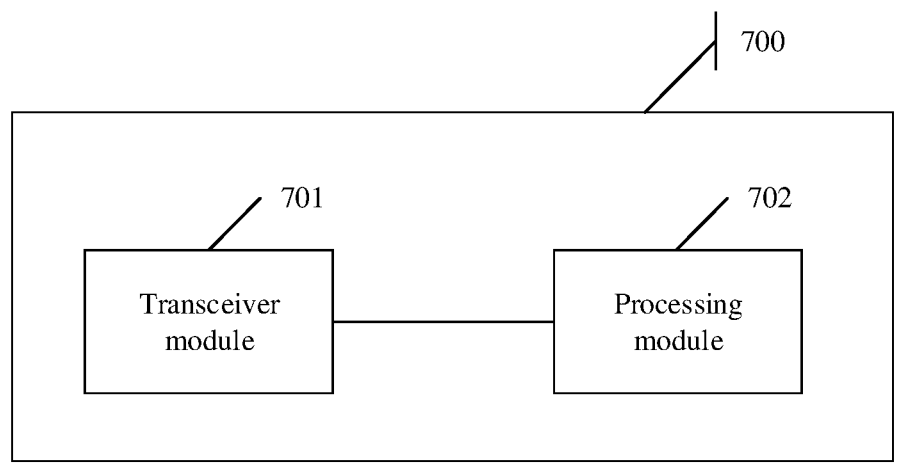
FIG. 7 is a schematic diagram of a structure of a communication apparatus according to an embodiment of this application.

FIG. 7 is a possible example block diagram of a communication apparatus in this application. The communication apparatus 700 may correspondingly implement functions or steps implemented by the UDM or the AUSF in the foregoing method embodiments. The communication apparatus may include a transceiver module 701 and a processing module 702. Optionally, the apparatus may further include a storage module for storing instructions (code or a program) and/or data. The transceiver module 701 and the processing module 702 may be coupled to the storage module. For example, the processing module 702 may read the instructions (the code or the program) and/or the data from the storage module for implementing a corresponding method. The foregoing modules may be independently deployed, or may be partially or completely integrated.

It should be understood that the processing module 702 may be a processor or a controller, for example, may be a general-purpose central processing unit (CPU), a general-purpose processor, a digital signal processing (DSP), an application-specific integrated circuit (ASIC), a field programmable gate array (FPGA) or another programmable logic device, a transistor logic device, a hardware component, or any combination thereof. The processing module 702 can implement or execute various examples of logical blocks, modules, and circuits that are described with reference to the content disclosed in this application. Alternatively, the processor may be a combination of processors implementing a computing function, for example, a combination of one or more microprocessors, or a combination of a DSP and a microprocessor. The transceiver module 701 is an interface circuit of the apparatus, for receiving a signal from another apparatus. For example, when the apparatus is implemented as a chip, the transceiver module 701 is an interface circuit of the chip for receiving a signal from another chip or apparatus, or an interface circuit of the chip for sending a signal to another chip or apparatus.

The communication apparatus 700 may be the UDM or the AUSF in the foregoing embodiments, or may be a chip used in the UDM or the AUSF. For example, when the communication apparatus 700 is the UDM or the AUSF, the processing module 702 may be, for example, a processor, and the transceiver module 701 may be, for example, a transceiver. Optionally, the transceiver may include a radio frequency circuit, and the storage unit may be, for example, a memory. For example, when the communication apparatus 700 is the chip used in the UDM or the AUSF, the processing module 702 may be, for example, a processor, and the transceiver module 701 may be, for example, an input/output interface, pins, or a circuit. The processing module 702 may execute computer-executable instructions stored in the storage unit. Optionally, the storage unit is a storage unit in the chip, such as a register or a cache. Alternatively, the storage unit may be a storage unit that is in the network device, the terminal, or the positioning management device and that is located outside the chip, for example, a read-only memory (read-only memory, ROM), another type of static storage device that can store static information and instructions, or a random access memory (random access memory, RAM).

In some possible implementations, the communication apparatus 700 can correspondingly implement behavior and functions of the UDM in the foregoing method embodiments. For example, the communication apparatus 700 may be a UDM, or may be a component (for example, a chip or a circuit) used in the UDM. The transceiver module 701 may be configured to support the UDM in communicating with another network entity, for example, support the UDM in communicating with the first AUSF and/or the AMF shown in FIG. 4 to FIG. 6. The processing module 702 is configured to control and manage actions of the UDM. For example, the processing module 702 is configured to support the network device in performing all operations of the UDM in FIG. 4 to FIG. 6 other than receiving and sending operations.

For example, the transceiver module 701 may be configured to perform all sending or receiving operations performed by the UDM in the embodiment shown in FIG. 4, for example, S401, S403, and S404 in the embodiment shown in FIG. 4, and/or support other processes of the technology described in this specification. The processing module 702 is configured to perform all operations other than the sending and receiving operations performed by the UDM in the embodiment shown in FIG. 4, and/or support other processes of the technology described in this specification.

For another example, the transceiver module 701 may be configured to perform all sending or receiving operations performed by the UDM in the embodiment shown in FIG. 5, for example, S401, S403, and S404 in the embodiment shown in FIG. 5, and/or support other processes of the technology described in this specification. The processing module 702 is configured to perform all operations other than the sending and receiving operations performed by the UDM in the embodiment shown in FIG. 5, for example, S501, S502, and S503 in the embodiment shown in FIG. 5, and/or support other processes of the technology described in this specification.

In some embodiments, the transceiver module 701 is configured to: send a protection request message to a first AUSF, and receive a response message that is of the protection request message and that is sent by the first AUSF, where the protection request message requests to protect terminal parameters update information, and the protection request message carries the parameters update information and information about a first serving network. The processing module 702 is configured to control the transceiver module 701 to send the parameters update information via an AMF corresponding to the first serving network.

In an optional implementation, the transceiver module 701 is further configured to: before sending the protection request message to the first AUSF, determine the information about the first serving network according to a local policy.

In an optional implementation, the processing module 702 is specifically configured to: when determining that there are multiple serving networks, determine the first serving network for terminal parameters update.

In an optional implementation, the processing module 702 is specifically configured to determine the first AUSF based on the information about the first serving network.

In an optional implementation, the processing module 702 is specifically configured to: before the protection request message is sent to the first AUSF, determine that the first AUSF includes authentication results for the terminal in multiple serving networks, where the multiple serving networks include the first serving network; the terminal is in multiple serving networks, where the multiple serving networks include the first serving network; or the terminal is in a dual-registration mode.

In an optional implementation, the information about the first serving network includes a name of the first serving network; the information about the first serving network includes a PLMN ID of the first serving network or an ID of the first serving network; or the information about the first serving network includes an authentication event identifier of the terminal.

In an optional implementation, the parameters update information includes SoR information.

It should be understood that the processing module 702 in this embodiment of this application may be implemented by a processor or a processor-related circuit component, and the transceiver module 701 may be implemented by a transceiver or a transceiver-related circuit component.

For another example, the transceiver module 701 may be configured to perform all sending or receiving operations performed by the UDM in the embodiment shown in FIG. 6, for example, S601 and S603 in the embodiment shown in FIG. 6, and/or support other processes of the technology described in this specification. The processing module 702 is configured to perform all operations other than the sending and receiving operations performed by the UDM in the embodiment shown in FIG. 6, for example, S602 in the embodiment shown in FIG. 6, and/or support other processes of the technology described in this specification.

In some embodiments, the transceiver module 701 is configured to send a first message to a first AUSF, where the first message indicates the first AUSF to delete a first key used when a terminal registers with a first serving network in which a first AMF is located, and the first AUSF is an AUSF for authentication when the terminal registers with the first serving network. The processing module 702 is configured to: when determining that the terminal is in a single-registration mode, determine to send terminal parameters update information via a second AMF.

In an optional implementation, the transceiver module 701 is specifically configured to: when sending a second message to the first AMF or receiving a third message sent by the first AMF, send the first message to the first AUSF, where the second message is for deleting registration information of the terminal, and the third message is a response message of the second message.

In an optional implementation, the first message carries identification information of the first serving network or identification information of the terminal.

In some possible implementations, the communication apparatus 700 can correspondingly implement behavior and functions of the first AUSF in the foregoing method embodiments. For example, the communication apparatus 700 may be an AUSF, or may be a component (for example, a chip or a circuit) used in the AUSF. The transceiver module 701 may be configured to support the AUSF in communicating with another network entity, for example, support the AUSF in communicating with the UDM shown in FIG. 4 to FIG. 6. The processing module 702 is configured to control and manage actions of the AUSF. For example, the processing module 702 is configured to support the AUSF in performing all operations other than sending and receiving operations in FIG. 4 to FIG. 6.

For example, the transceiver module 701 may be configured to perform all sending or receiving operations performed by the first AUSF in the embodiment shown in FIG. 4, for example, S401, S403, and S404 in the embodiment shown in FIG. 4, and/or support other processes of the technology described in this specification. The processing module 702 is configured to perform all operations other than the sending and receiving operations performed by the first AUSF in the embodiment shown in FIG. 4, for example, S402 in the embodiment shown in FIG. 4, and/or support other processes of the technology described in this specification.

For another example, the transceiver module 701 may be configured to perform all sending or receiving operations performed by the first AUSF in the embodiment shown in FIG. 5, for example, S401, S403, and S404 in the embodiment shown in FIG. 5, and/or support other processes of the technology described in this specification. The processing module 702 is configured to perform all operations other than the sending and receiving operations performed by the first AUSF in the embodiment shown in FIG. 5, for example, S402 in the embodiment shown in FIG. 5, and/or support other processes of the technology described in this specification.

The transceiver module 701 is configured to receive a protection request message sent by a UDM, where the protection request message requests to protect terminal parameters update information, and the protection request message carries the parameters update information and information about a first serving network. The processing module 702 is configured to: determine a first key based on the information about the first serving network, and security protect the parameters update information based on the first key, where the first key is for protecting the parameters update information.

In a possible implementation, the information about the first serving network is information about one of multiple first serving networks that is stored by the UDM.

In an optional implementation, there are multiple AUSFs, and the first AUSF is an AUSF corresponding to the information about the first serving network.

In an optional implementation, the first AUSF includes authentication results for the terminal in multiple serving networks, where the multiple serving networks include the first serving network; the terminal is in multiple serving networks, where the multiple serving networks include the first serving network; or the terminal is in a dual-registration mode.

In an optional implementation, the information about the first serving network includes a name of the first serving network; the information about the first serving network includes a PLMN identifier of the first serving network; or the information about the first serving network includes an authentication event identifier of the terminal.

In an optional implementation, the parameters update information includes SoR information.

For another example, the transceiver module 701 may be configured to perform all sending or receiving operations performed by the first AUSF in the embodiment shown in FIG. 6, for example, S601 and S603 in the embodiment shown in FIG. 6, and/or support other processes of the technology described in this specification. The processing module 702 is configured to perform all operations other than the sending and receiving operations performed by the first AUSF in the embodiment shown in FIG. 6, for example, S602 in the embodiment shown in FIG. 6, and/or support other processes of the technology described in this specification.

The transceiver module 701 is configured to receive a first message sent by a UDM, where the first message indicates the first AUSF to delete a first key used when a terminal registers with a first serving network in which a first AMF is located, and the first AUSF is an AUSF for authentication when the terminal registers with the first serving network. The processing module 702 is configured to delete the first key used when the terminal registers with the first serving network in which the first AMF is located.

In a possible implementation, the first message carries identification information of the first serving network or identification information of the terminal.

Figure 8:
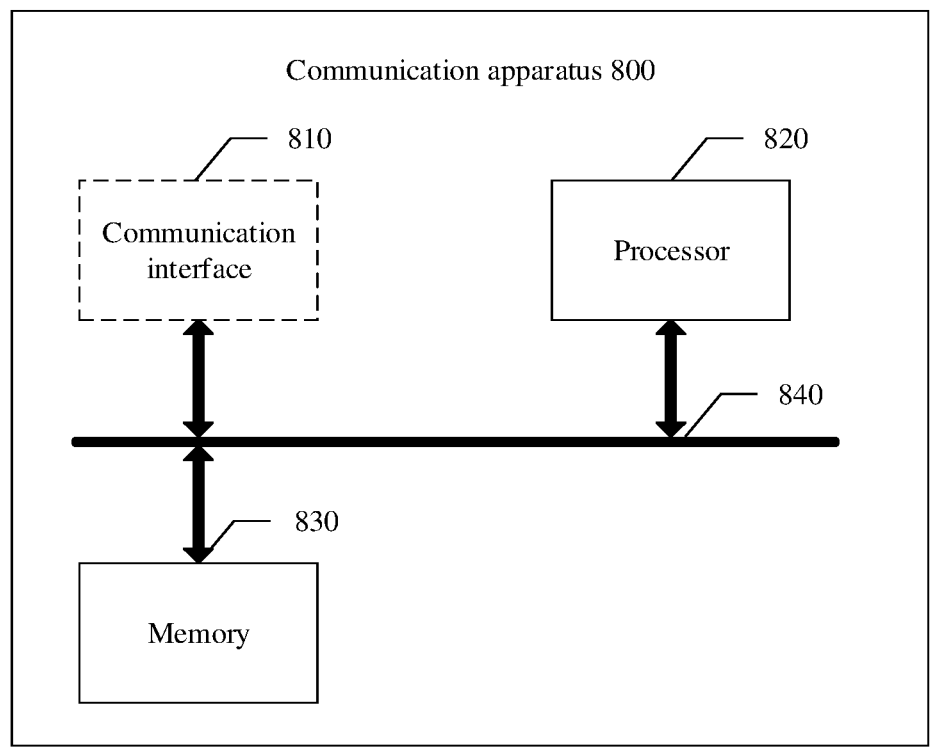
FIG. 8 is another schematic diagram of a structure of a communication apparatus according to an embodiment of this application.

FIG. 8 shows a communication apparatus 800 according to an embodiment of this application. The communication apparatus 800 may be a UDM capable of implementing functions of the UDM in the method provided in embodiments of this application. Alternatively, the communication apparatus 800 may be an AUSF capable of implementing functions of the first AUSF in the method provided in embodiments of this application. Alternatively, the communication apparatus 800 may be an apparatus supporting the UDM or the AUSF in implementing corresponding functions in the method provided in embodiments of this application. The communication apparatus 800 may be a chip system. In this embodiment of this application, the chip system may include a chip, or may include a chip and another discrete component.

In hardware implementation, the transceiver module 701 may be a transceiver, and the transceiver is integrated into the communication apparatus 800 to form a communication interface 803.

The communication apparatus 800 includes at least one processor 802. The processor 802 may be a CPU, a microprocessor, an ASIC, or one or more integrated circuits for controlling program execution in the solutions of this application. The processor 802 is configured to implement or support the communication apparatus 800 in implementing functions of the UDM or the AUSF in the methods provided in embodiments of this application. For details, refer to detailed descriptions in the method examples. Details are not described herein again.

The communication apparatus 800 may further include at least one memory 801 for storing program instructions and/or data. The memory 801 is coupled to the processor 802. Coupling in embodiments of this application is an indirect coupling or a communication connection between apparatuses, units, or modules, may be in an electrical, a mechanical, or another form, and is used for information exchange between apparatuses, units, or the modules. The processor 802 may coordinate with the memory 801. The processor 802 may execute the program instructions and/or the data stored in the memory 801, so that the communication apparatus 800 implements a corresponding method. At least one of the at least one memory may be included in the processor 802.

The communication apparatus 800 may further include the communication interface 803, configured to communicate with another device or a communication network such as a radio access network (radio access network, RAN), a wireless local area network (wireless local area network, WLAN), or a wired access network using any transceiver-type apparatus. The communication interface 803 is configured to communicate with another device via a transmission medium, so that an apparatus used in the communication apparatus 800 can communicate with the another device. For example, when the communication apparatus 800 is a UDM, the another device is an AUSF; or when the communication apparatus 800 is an AUSF, the another device is a UDM. The processor 802 may send and receive data through the communication interface 803. The communication interface 803 may be specifically a transceiver.

A connection medium between the communication interface 803, the processor 802, and the memory 801 is not specifically limited in this embodiment of this application. In this embodiment of this application, the memory 801, the processor 802, and the communication interface 803 are connected through a bus 804 in FIG. 8. The bus is represented as a bold line in FIG. 8. A manner of connection between other components is merely an example for description, and imposes no limitation. The bus may be classified as an address bus, a data bus, a control bus, and the like. For ease of indication, the bus is indicated using only one bold line in FIG. 8. However, it does not indicate that there is only one bus or only one type of bus.

In this embodiment of this application, the processor 802 may be a general-purpose processor, a digital signal processor, an application-specific integrated circuit, a field programmable gate array or another programmable logic device, a discrete gate or transistor logic device, or a discrete hardware component. The processor 802 can implement or execute the methods, steps, and logical block diagrams disclosed in embodiments of this application. The general-purpose processor may be a microprocessor or any conventional processor. The steps of the methods disclosed with reference to embodiments of this application may be directly performed by a hardware processor, or may be performed by a combination of hardware in a processor and a software module.

The memory 801 may be a ROM, another type of static storage device that can store static information and instructions, a RAM, or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in an instruction form or a data structure form and that can be accessed by a computer. However, the memory 801 is not limited thereto. The memory may exist independently and is connected to the processor through the communication bus 804. Alternatively, the memory may be integrated with the processor.

The memory 801 is configured to store computer-executable instructions for performing the solutions of this application, and the processor 802 controls the execution. The processor 802 is configured to execute the computer-executable instructions stored in the memory 801, to implement the method for protecting terminal parameters update provided in the foregoing embodiment of this application.

Optionally, the computer-executable instructions in this embodiment of this application may also be referred to as application program code. This is not specifically limited in this embodiment of this application.

An embodiment of this application further provides a communication apparatus, which may be a circuit. The communication apparatus may be configured to perform actions performed by the UDM or the first AUSF in the foregoing method embodiments.

An embodiment of this application further provides a communication system. Specifically, the communication system includes a UDM and an AUSF. For example, the communication system includes a UDM and an AUSF for implementing related functions in FIG. 4, FIG. 5, and FIG. 6. Optionally, the communication system may further include more UDMs and/or AUSFs.

The UDM is configured to implement UDM-related functions in FIG. 4, FIG. 5, and FIG. 6. The AUSF is configured to implement AUSF-related functions in FIG. 5, FIG. 6, FIG. 7, or FIG. 8. For details, refer to related description in the method embodiments. Details are not described herein again.

An embodiment of this application further provides a computer-readable storage medium, including instructions. When the instructions are run on a computer, the computer is enabled to perform the methods performed by the UDM or the AUSF in FIG. 4, FIG. 5, and FIG. 6.

An embodiment of this application further provides a computer program product, including instructions. When the instructions are run on a computer, the computer is enabled to perform the methods performed by the UDM or the AUSF in FIG. 4, FIG. 5, and FIG. 6.

An embodiment of this application provides a chip system. The chip system includes a processor, and may further include a memory for implementing functions of the UDM and the AUSF in the foregoing method. The chip system may include a chip, or may include a chip and another discrete component.

All or some of the methods in embodiments of this application may be implemented using software, hardware, firmware, or any combination thereof. When software is used for implementation, embodiments may be implemented completely or partially in a form of a computer program product. The computer program product includes one or more computer instructions. When the computer program instructions are loaded and executed on a computer, the procedures or the functions according to embodiments of the present invention are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital video disc (digital video disc, DVD for short)), a semiconductor medium (for example, an SSD), or the like.

It is clearly that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A communication method, implemented in an extensible authentication protocol (EAP) authentication and key agreement (AKA) authentication, comprising:
   receiving, by a communication apparatus, an authentication request from a security anchor function;
   calculating, by the communication apparatus, an authentication response and keys CK' and IK';
   sending, by the communication apparatus, the authentication response carried in an EAP response to the security anchor function;
   receiving, by the communication apparatus, an EAP success message, wherein the EAP success message is sent by an authentication service function network element through the security anchor function, and the EAP success message is configured to trigger the communication apparatus to generate a new authentication service function key (KAUSF) and to delete a stored old KAUSF on the communication apparatus; and
   generating, by the communication apparatus, the new KAUSF based on the keys CK' and IK' in response to receiving the EAP success message and deleting the stored old KAUSF.

2. The method according to claim 1, further comprising setting, by the communication apparatus, a timer upon receipt of the EAP success message, wherein the stored old KAUSF is deleted after an expiration of the timer.

3. The method according to claim 1, wherein the EAP success message is received from the security anchor function.

4. The method according to claim 1, wherein sending, by the communication apparatus, the authentication response carried in the EAP response to the security anchor function comprises sending the authentication response carried in the EAP response to the authentication service function network element through the security anchor function to trigger the authentication service function network element authenticating the authentication response and then generating the new KAUSF and deleting the old KAUSF on the authentication service function network element in response to successful authenticating.

5. A communication apparatus, comprising:
a processor; and
a memory storing a computer program that, when executed by the processor, enables the apparatus to:
receive an authentication request from a security anchor function,
calculate an authentication response and keys CK' and IK',
send the authentication response carried in an extensible authentication protocol (EAP) response to the security anchor function,
receive an EAP success message, wherein the EAP success message is sent by an authentication service function network element through the security anchor function, and the EAP success message is configured to trigger the communication apparatus to generate a new authentication service function key (KAUSF) and to delete a stored old KAUSF on the communication apparatus, and
generate the new KAUSF based on the keys CK' and IK' in response to receiving the EAP success message and delete the stored old KAUSF.

6. The apparatus according to claim 5, wherein the apparatus comprises a terminal designed to implement 5G authentication and key agreement (AKA) authentication.

7. The apparatus according to claim 5, wherein the apparatus comprises a terminal designed to implement EAP-AKA authentication.

8. The apparatus according to claim 5, wherein the computer program, when executed by the processor, further enables the apparatus to set a timer upon receipt of the EAP success message, wherein the stored old KAUSF is deleted after an expiration of the timer.

9. The apparatus according to claim 5, wherein the computer program, when executed by the processor, enables the apparatus to send the authentication response carried in the EAP response to the authentication service function network element through the security anchor function to trigger the authentication service function network element authenticating the authentication response and then generating the new KAUSF and deleting the old KAUSF on the authentication service function network element in response to successful authenticating.

10. The apparatus according to claim 5, wherein the apparatus is a user equipment (UE).

11. A communication method, implemented in extensible authentication protocol (EAP) authentication and key agreement (AKA) authentication, comprising:
receiving, by an authentication service function network element, an authentication obtaining response of a terminal from a unified data management, wherein the authentication obtaining response comprises keys CK' and IK';
sending, by the authentication service function network element, a terminal authentication response to a security anchor function;
receiving, by the authentication service function network element, an authentication request of the terminal from the security anchor function, wherein the authentication request comprises an authentication response returned by the terminal carried in an EAP response;
authenticating, by the authentication service function network element, the authentication response returned by the terminal carried in the EAP response;
generating, by the authentication service function network element, a new authentication service function key (KAUSF) based on the keys CK' and IK' in response to the authentication of the authentication response returned by the terminal succeeding, and deleting an old KAUSF corresponding to the terminal; and
sending, by the authentication service function network element, an EAP success message to the terminal through the security anchor function to trigger the terminal to generate the new KAUSF and to delete the old KAUSF on the terminal.

12. The method according to claim 11, wherein the method further comprises:
receiving, by the security anchor function, the terminal authentication response;
sending, by the security anchor function, the authentication request to the terminal;
receiving, by the security anchor function, the authentication response carried in the EAP response from the terminal;
sending, by the security anchor function, the authentication request of the terminal to the authentication service function network element, wherein the authentication request comprises the EAP response;
receiving, by the security anchor function, the EAP success message; and
sending, by the security anchor function, the EAP success message to the terminal.

13. The method according to claim 11, further comprising:
before deleting the old KAUSF, receiving, by the authentication service function network element, a first message indicating to delete the old KAUSF.

14. The method according to claim 13, wherein the first message is received from a unified data management entity (UDM).

15. A communication apparatus comprising:
a processor; and
a memory storing a computer program that, when executed by the processor, enables the apparatus to:
receive an authentication obtaining response of a terminal from a unified data management, wherein the authentication obtaining response comprises keys CK' and IK';
send a terminal authentication response to a security anchor function;
receive an authentication request of the terminal from the security anchor function, wherein the authentication request comprises an authentication response returned by the terminal carried in an extensible authentication protocol (EAP) response;
authenticate the authentication response returned by the terminal and carried in the EAP response;
generate a new authentication service function key (KAUSF) based on the keys CK' and IK' in response to the authentication of the authentication response returned by the terminal succeeding and delete an old KAUSF corresponding to the terminal; and
send an EAP success message to the terminal through the security anchor function to trigger the terminal to generate the new KAUSF and to delete the old KAUSF on the terminal.

16. A system comprising:
the communication apparatus of claim 15, wherein the communication apparatus comprises an authentication service function network element; and
the security anchor function comprising a second processor and a second memory storing a second computer program that, when executed by the second processor, causes the second processor to:
receive the terminal authentication response;
send the authentication request to the terminal;
receive an authentication response carried in the EAP response from the terminal;
send the authentication request of the terminal to the authentication service function network element, wherein the authentication request comprises the EAP response;
receive the EAP success message; and
send the EAP success message to the terminal.

17. The apparatus according to claim 15, wherein the computer program, when executed by the processor, further enables the apparatus to:
before deleting the old KAUSF, receive a first message indicating to delete the old KAUSF.

18. The apparatus according to claim 17, wherein the first message is received from a unified data management entity (UDM).

* * * * *